United States Patent
Cho et al.

(10) Patent No.: US 10,821,968 B2
(45) Date of Patent: Nov. 3, 2020

(54) DRIVING CONTROL METHOD AND SYSTEM USING ROAD SURFACE ADAPTABILITY

(71) Applicants: Hyundai Motor Company, Seoul (KR); Kia Motors Corporation, Seoul (KR); Institute for Research & Industry Cooperation. Pusan National University, Busan (KR)

(72) Inventors: Wanki Cho, Whasung-Si (KR); Jaesung Cho, Whasung-Si (KR); Yeayoung Park, Whasung-Si (KR); Changsun Ahn, Whasung-Si (KR)

(73) Assignees: Hyundai Motor Company, Seoul (KR); Kia Motors Corporation, Seoul (KR); Institute for Research & Industry Cooperation. Pusan National University, Busan (KR)

( * ) Notice: Subject to any disclaimer, the term of this patent is extended or adjusted under 35 U.S.C. 154(b) by 196 days.

(21) Appl. No.: 15/858,975

(22) Filed: Dec. 29, 2017

(65) Prior Publication Data
US 2019/0001965 A1  Jan. 3, 2019

(30) Foreign Application Priority Data
Jul. 3, 2017  (KR) .......................... 10-2017-0084168

(51) Int. Cl.
| | | |
|---|---|---|
| *B60K 31/00* | (2006.01) | |
| *G06F 17/00* | (2019.01) | |
| *B60W 10/04* | (2006.01) | |
| *B60W 10/08* | (2006.01) | |
| *B60W 40/06* | (2012.01) | |
| *B60T 7/12* | (2006.01) | |

(Continued)

(52) U.S. Cl.
CPC .......... *B60W 30/025* (2013.01); *B60W 40/06* (2013.01); *B60W 2420/42* (2013.01); *B60W 2420/52* (2013.01); *B60W 2552/35* (2020.02); *B60W 2710/0666* (2013.01); *B60W 2720/30* (2013.01)

(58) Field of Classification Search
None
See application file for complete search history.

(56) References Cited

U.S. PATENT DOCUMENTS

| | | | |
|---|---|---|---|
| 6,192,309 B1 * | 2/2001 | Prestl ................. | B60K 31/0008 180/170 |
| 2007/0150158 A1 * | 6/2007 | Inoue ................. | B60W 30/188 701/93 |

(Continued)

FOREIGN PATENT DOCUMENTS

| | | |
|---|---|---|
| JP | 2006-315607 A | 11/2006 |
| JP | 2007-196869 A | 8/2007 |

(Continued)

*Primary Examiner* — Adam D Tissot
*Assistant Examiner* — Laura E Linhardt
(74) *Attorney, Agent, or Firm* — Morgan, Lewis & Bockius LLP

(57) ABSTRACT

A driving control method may include performing a road surface adaptability control in which when an uneven road surface of a road on which a vehicle is driven is recognized by a controller, a wheel torque control of the vehicle is performed so that a squat effect and a dive effect are generated in the vehicle passing through the uneven road surface.

18 Claims, 7 Drawing Sheets

(51) Int. Cl.
*B60T 8/00* (2006.01)
*B60W 30/02* (2012.01)

(56) References Cited

U.S. PATENT DOCUMENTS

| | | | |
|---|---|---|---|
| 2012/0053790 A1* | 3/2012 | Oikawa | B60W 10/08 |
| | | | 701/37 |
| 2014/0163837 A1* | 6/2014 | Um | B60W 30/143 |
| | | | 701/93 |
| 2015/0025745 A1 | 1/2015 | Tamura et al. | |
| 2016/0121862 A1* | 5/2016 | Richards | B60G 17/015 |
| | | | 701/37 |
| 2016/0334798 A1* | 11/2016 | Foster | G05D 1/0223 |
| 2017/0096144 A1* | 4/2017 | Elie | G06K 9/2018 |
| 2018/0001887 A1* | 1/2018 | Watanabe | B60W 30/146 |
| 2019/0108760 A1* | 4/2019 | Krishna | G01C 5/005 |

FOREIGN PATENT DOCUMENTS

| | | |
|---|---|---|
| JP | 2007-237820 A | 9/2007 |
| JP | 2009-234454 A | 10/2009 |
| KR | 10-2010-0032940 A | 3/2010 |
| KR | 10-1567206 B1 | 11/2015 |
| KR | 10-2016-0090621 A | 8/2016 |

* cited by examiner $\tau_1 \sim \tau_6$ : SET VALUE DEPENDING ON VEHICLE WEIGHT AND SUSPENSION PROPERTY $t_a \sim t_i$ : SET VALUE DEPENDING ON VEHICLE WEIGHT AND SUSPENSION PROPERTY $t_1 = t_0 + \dfrac{0.5d}{v(t_0)}$ $t_2 = t_1 + \dfrac{0.5d}{v(t_1)}$ $t_3 = t_2 + \dfrac{L-d}{v(t_2)}$ $t_4 = t_3 + \dfrac{0.5d}{v(t_3)}$ $t_5 = t_4 + \dfrac{0.5d}{v(t_4)}$

TARGET ENGINE TORQUE $T_{eng}(k) = T_{eng,target}(k+\tau)$

TARGET ENGINE TORQUE $P_{brk}(k) = \dfrac{T_{brk,target}(k)}{K_{brk}}$

DRIVING CONTROL METHOD AND SYSTEM USING ROAD SURFACE ADAPTABILITY

CROSS-REFERENCE(S) TO RELATED APPLICATIONS

The present application claims priority to Korean Patent Application No. 10-2017-0084168, filed on Jul. 3, 2017, the entire contents of which is incorporated herein for all purposes by this reference.

BACKGROUND OF THE INVENTION

Field of the Invention

The present invention relates to a driving control of a vehicle, and more particularly, to a driving control method using road surface adaptability and an advanced driving control system configured for improving ride comfort by adapting to a road surface shape.

Description of Related Art

Recently, a driving control technology applied to a vehicle has been developed as a driving control technology aiming to improve ride comfort, in addition to a basic concept of implementing driving stability by automatic vehicle speed control.

As an example of the driving control technology, there is a method of configuring a driving control system with a hydraulic cylinder provided in each suspension of four wheels and a front-view camera and mounting the driving control system in a vehicle, scanning a front road surface using the front-view camera when the vehicle is driven to recognize a road surface shape, and using an active suspension controlling the hydraulic cylinder according to the recognized road surface shape, improving ride comfort.

Accordingly, the driving control technology may provide more improved ride comfort to a driver by controlling a posture of the vehicle to adapt to various road surface shapes.

However, in the driving control technology, since the hydraulic cylinder is applied in implementing the active suspension for improving ride comfort, a lot of power is required to control an operation of the hydraulic cylinder.

The hydraulic cylinder needs to be essentially mounted in each suspension of four wheels, consequentially a weight of the vehicle is increased, which hinders improvement of fuel efficiency, and costs rise, which deteriorates marketability.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a driving control method using road surface adaptability and an advanced driving control system, in which a bounce motion is canceled out through a squat effect and a dive effect that are generated by a change of a vehicle speed when passing through an uneven road shape detected by a camera, improving ride comfort under varying road surface condition, particularly, a bounce motion is canceled out by wheel torque control by an engine and a brake, realizing relatively advantageous weight and cost for an operation of the hydraulic cylinder.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a driving control method may include: (A) performing road surface detection on an uneven road surface in a photographed road image of a road on which a vehicle is driven by use of an environment detector disposed in the vehicle, (B) performing a road-surface auto driving mode control in which wheel torque for changing vehicle speed of the vehicle before the vehicle passes through the uneven road surface is determined upon the road surface detection, and a wheel torque control is performed based on the wheel torque so that a squat effect and a dive effect are continuously generated in the vehicle while the vehicle approaches and passes through the uneven road surface to change a speed of the vehicle, and (C) recovering the vehicle speed by driving the vehicle in a state in which the wheel torque control is stopped after a rear wheel of the vehicle passes through the uneven road surface, subsequent to the passage of a front wheel of the vehicle.

The performing of the road-surface auto driving mode control may include (b-1) generating a coordinate of the uneven road surface to recognize a road surface shape, (b-2) determining predicted engine torque and predicted brake torque of the vehicle for passing through the uneven road surface as predicted wheel torque, (b-3) determining target engine torque and target brake pressure of the vehicle as a target control value based on the predicted wheel torque to be applied as the wheel torque for approaching and passing through the uneven road surface, and (b-4) performing the wheel torque control based on the wheel torque.

The performing of the wheel torque control may include (b-5) dividing the uneven road surface into a front entering position with respect to the uneven road surface, a start position, an intermediate position, and an end position of the uneven road surface are divided as the coordinate of the uneven road surface and setting the front entering position as a reference position for determination of a wheel approach condition to determine the wheel approach condition of the vehicle with respect to the uneven road surface; (b-6) performing a front wheel road surface control on the front wheel of the vehicle entering the uneven road surface if the wheel approach condition is satisfied to generate the squat effect and the dive effect; and (b-7) performing a rear wheel road surface control on the rear wheel of the vehicle entering the uneven road surface to generate the squat effect and the dive effect.

The performing of the front wheel road surface control may include (b-6-1) performing deceleration before the front wheel enters in which the vehicle is decelerated in a section from the entering position to the start position until entering the start position; (b-6-2) performing acceleration in which the vehicle is accelerated by the wheel torque control from a point in time when the front wheel of the vehicle enters the start position until reaching the intermediate position; (b-6-3) performing deceleration in which the vehicle is decelerated by the wheel torque control until the front wheel from the intermediate position reaches the end position; and (b-6-4) maintaining the vehicle speed by stopping the wheel torque control when the front wheel gets out of the end position to complete the passage of the front wheel through the uneven road surface.

The deceleration before the front wheel enters may be performed from 0.1 seconds before the start position until entering the start position. In the performing of the acceleration, acceleration may be increased from the start position toward the intermediate position and then be decreased, by the wheel torque control. The acceleration may be decreased to be 0 when reaching the intermediate position.

The performing of the rear wheel road surface control may include (b-7-1) performing deceleration before the rear wheel enters in which the vehicle is decelerated in a section from the entering position to the start position until entering the start position; (b-7-2) performing acceleration in which the vehicle is accelerated by the wheel torque control from a point in time when the rear wheel of the vehicle enters the start position until reaching the intermediate position; (b-7-3) performing deceleration in which the vehicle is decelerated by the wheel torque control until the rear wheel from the intermediate position reaches the end position; and (b-7-4) maintaining the vehicle speed by stopping the wheel torque control when the rear wheel gets out of the end position to complete the passage of the rear wheel through the uneven road surface.

The deceleration before the rear wheel enters may be performed from 0.1 seconds before the start position until entering the start position. In the performing of the acceleration, acceleration may be increased from the start position toward the intermediate position and then be decreased, by the wheel torque control. The acceleration may be decreased to be 0 when reaching the intermediate position.

If the uneven road surface is not detected, a vehicle-speed auto driving mode control for securing driving stability by controlling the vehicle speed with respect to an even road surface, may be performed.

In accordance with various exemplary embodiments of the present invention, an advanced driving control system may include: an environment detector configured to be mounted in a vehicle including a suspension system in each of four wheels and detect an uneven protruding road surface in a photographed road image of a road on which the vehicle is driven; a controller configured to perform a wheel torque control of the vehicle in which the vehicle is accelerated when the vehicle passing through the uneven road surface to generate a squat effect in the vehicle and then is decelerated to generate a dive effect in the vehicle; and a road surface adaptability map configured to be linked with the controller to determine wheel torque for the wheel torque control.

The wheel torque control may be performed respectively on a front wheel and a rear wheel of the vehicle passing through the uneven road surface. The environment detector may be configured by any one of a monocular camera, a stereo camera, light detection and range (LiDAR), or a combination thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
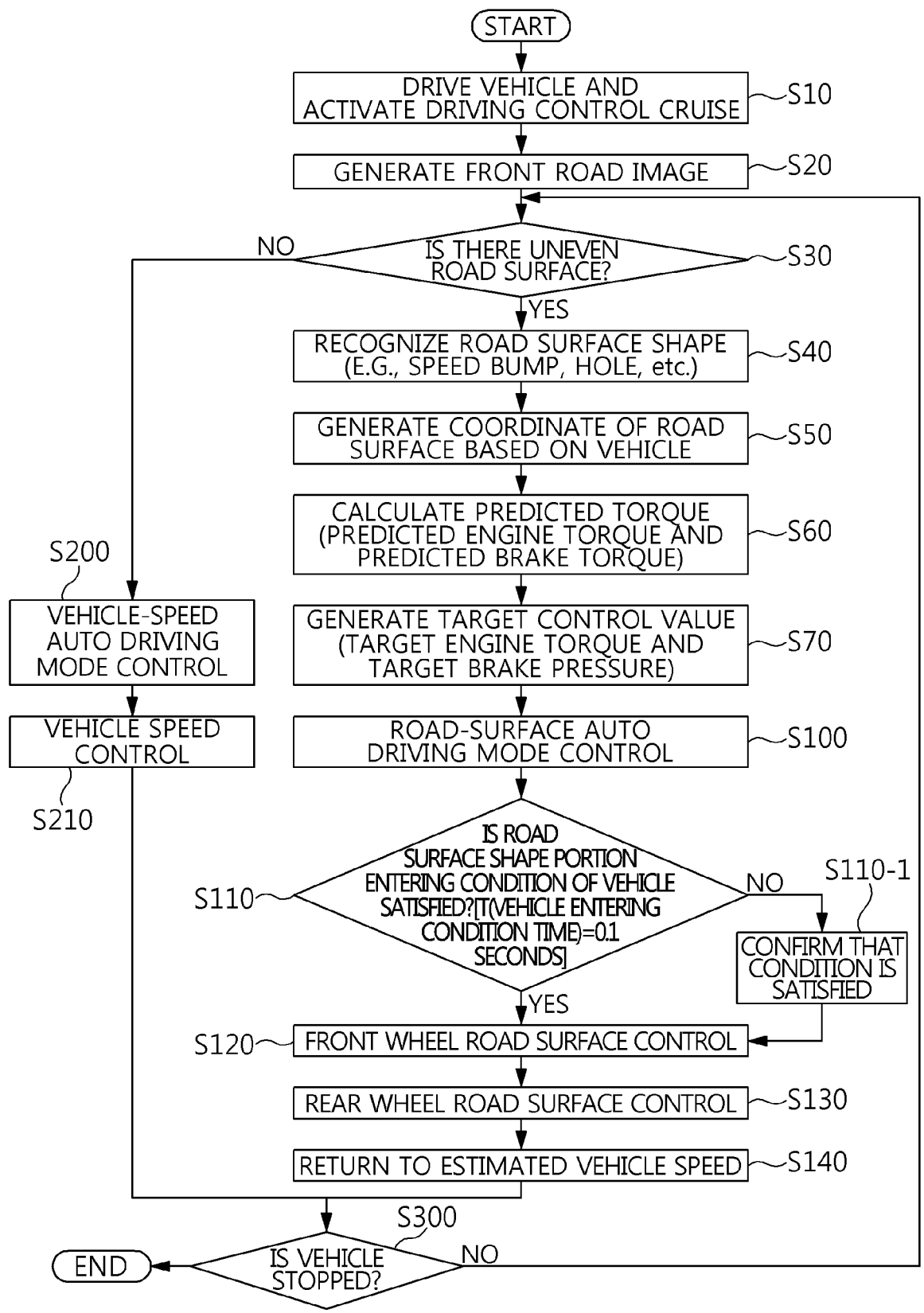
FIG. 1 is a flowchart of a driving control method using road surface adaptability according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a driving control method is implemented as a driving control technology using road surface adaptability by performing a road surface adaptability control for improving ride comfort in addition to improving driving stability. To the present end, in the driving control method, when an uneven road surface is present on a front road when a vehicle is driven (S10 and S20), a target control value facilitating a passage without deterioration of ride comfort is generated (S20 to S70), and a road-surface auto driving mode control in which a bounce motion caused by passing through the uneven road surface is canceled out by a wheel torque control based on the target control value is performed (S100 to S140). On the other hand, if there is no uneven road surface on the front road when the vehicle is driven (S10 and S20), a vehicle-speed auto driving mode control is performed by a vehicle speed control in which an existing driving control function is applied (S200).

As a result, the road-surface auto driving mode implements road surface adaptability, which cancels out a bounce motion of the vehicle by a squat/dive effect generated by a change of a vehicle speed including acceleration and deceleration by the wheel torque control based on the target control value while a front wheel and a rear wheel pass through the uneven road surface, stabilizing the center of gravity of the vehicle to improve ride comfort. Here, the squat effect is an effect that a front portion of the vehicle is lifted at the time of quick start of the vehicle, and the dive effect is an effect that the front portion of the vehicle is lowered at the time of sudden stop of the vehicle.

Figure 2:
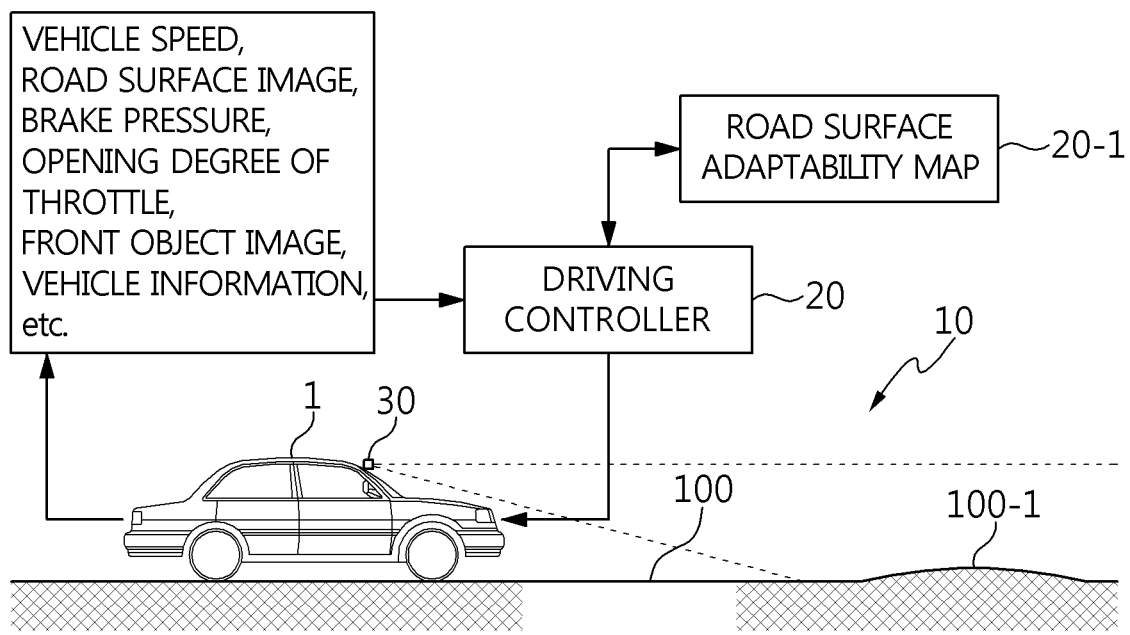
FIG. 2 is a schematic diagram of an advanced driving control system applied to a vehicle according to an exemplary embodiment of the present invention.

Referring to FIG. 2, a vehicle 1 includes an advanced driving control system 10. The advanced driving control system 10 includes a controller 20, a road surface adaptability map 20-1, and an environment detector 30, forms network in a vehicle communication method, and controls wheel torque by engine torque of an engine system and brake pressure of a brake system.

For example, the controller performs the auto driving mode control in which a vehicle speed control is performed based on information on the front road of the environment detector 30 when the vehicle 1 is driven on the road to secure driving stability, and furthermore, the road-surface auto driving mode control in which the wheel torque control is performed for the uneven road surface on the front road detected by the environment detector 30 to improve ride comfort. The road-surface adaptability map 20-1 generates a coordinate of the uneven road surface from the information on the uneven road surface of the environment detector 30, predicted torque (e.g., predicted engine torque and predicted brake torque) in a triangular form according to relative positions of front and rear wheels, and a target control value (e.g., target engine torque and target brake pressure) and provides them to the controller 20. To the present end, the road surface adaptability map 20-1 is configured to be separated from the controller 20 or to be integrally formed with the controller 20. The environment detector 30 acquires an image of a road on which the vehicle is driven and the uneven road surface of the front road (e.g., a protruding portion including a speed bump and a sunken portion including a pothole), and provide the acquired image to the controller 20 and/or the road surface adaptability map 20-1. To the present end, the environment detector 30 is configured by a monocular camera, a stereo camera, LiDAR (light detection and range), or a combination thereof. The monocular camera scans an image fed for pattern recognition. The stereo camera extracts disparity to photograph an image used to directly determine a value of a distance from the camera and an actual position of the pattern. The LiDAR which is a 3D type measures a time for which light is irradiated and returns to measure a coordinate of a position of a reflector.

As the controller 20, an electronic stability control (ESC) system controlling cornering stability of the vehicle 1 may be used. In the instant case, the ESC system is designed to include all the functions of the controller 20 and the road surface adaptability map 20-1. Therefore, the advanced driving control system 10 may be relatively simply implemented in the ESC-mounted vehicle by additionally mounting the environment detector 30.

Hereinafter, the driving control method in which a speed bump 100-1 protruding on a road surface of the road 100 is applied will be described more specifically with reference to FIGS. 2 to 8. The controller 20 linked with the road surface adaptability map 20-1 performs a control, and wheel torque of the vehicle 1 is controlled. The wheel torque is controlled by a change of engine torque of the engine system and brake pressure of the brake system by the controller 20.

Determination of the road surface adaptability is performed by the controller 20. The determination of the road surface adaptability is performed by activating a driving control function according to the driving of the vehicle in S10, processing the image of the front road photographed by the environment detector in S20, and detecting an uneven road surface in S30.

Referring to FIG. 2, the controller 20 processes vehicle speed, brake pressure, an opening amount of a throttle, etc., according to the driving of the vehicle 20 as vehicle information and processes a road surface image and a front object image as road information. The environment detector 30 photographs the surrounding area of the road and the front road at a front surface of the vehicle 1 and detects an uneven road surface from the photographed road image to transmit the detection result to the controller 20. Therefore, the controller 20 utilizes the road image in determining the road surface adaptability to determine the road 100 as an even road surface or an uneven protruding road surface. As a result of the determination, if the road surface is the even surface, the controller 20 converts its control to the vehicle-speed auto driving mode control in S200 to perform the existing driving control function for securing driving stability through the vehicle speed control as in S210. On the other hand, if the road surface is the uneven protruding road surface, the controller 20 begins vehicle wheel torque determination after the determination of the road surface adaptability.

The vehicle wheel torque determination is performed by the controller 20. The vehicle wheel torque determination is performed by recognizing a road surface shape of the uneven road surface as a speed bump in S40, generating a coordinate of the speed bump based on the vehicle in S50, determining predicted wheel torque using predicted engine torque and predicted brake torque for passing through the speed bump in S60, and generating a target control value using target engine torque and target brake pressure for passing through the speed bump without deteriorating the ride comfort to determine wheel torque in S70.

Figure 3:
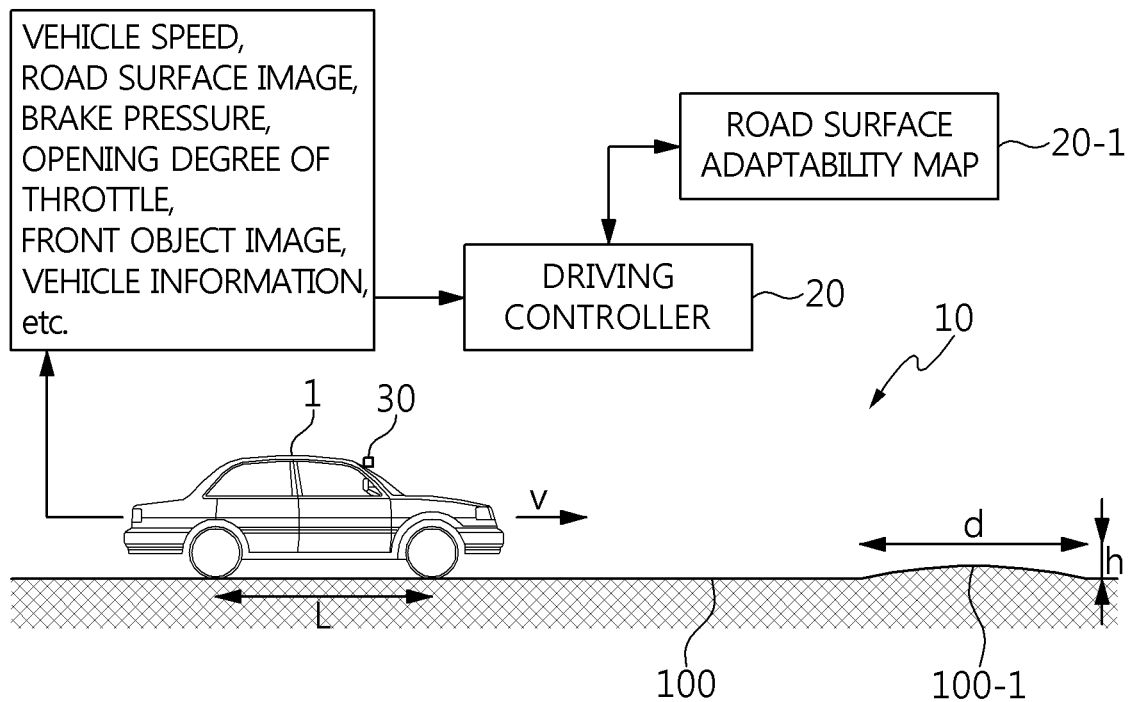
FIG. 3 is an example of application of a coordinate of a road surface for adaptability to a protruding road surface of a front road, which is acquired when the vehicle is driven.

Referring to FIG. 3, the controller 20 recognizes the uneven road surface of the input road image as the speed bump 100-1, and performs the vehicle wheel torque determination by being linked with the road surface adaptability map 20-1. In the instant case, the vehicle based on which the coordinate is generated is the vehicle 1 having a wheelbase of L and driven at vehicle speed of v. Furthermore, a 2-dimensional x-y coordinate system in which an x-axis is a length and a y-axis is a height is applied to the speed bump 100-1, but if necessary, a 3-dimensional x-y-z coordinate system in which an x-axis is a length, a y-axis is a width, and a z-axis is a height may be applied. Accordingly, in the determination of the road surface coordinate in S50, a length d and a height h of the speed bump 100-1 are determined from the x-y coordinate. In the instant case, values of d and h may be fixed, but they are changed depending on a shape condition, thus are not limited to specific values.

Figure 4:
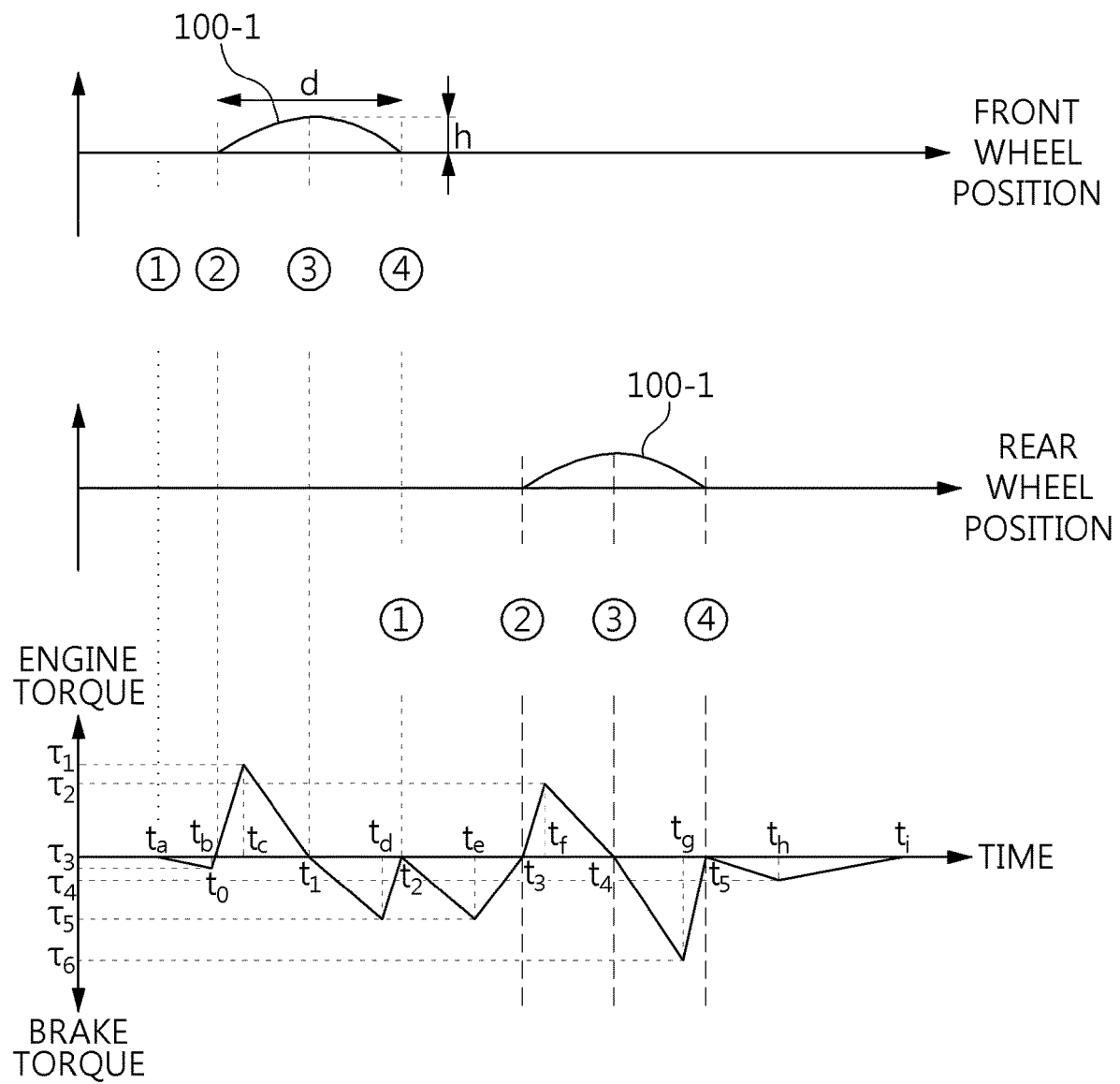
FIG. 4 is an example of a triangular torque pattern of predicted torque and target torque according to an exemplary embodiment of the present invention.

Referring to FIG. 4, the controller 20 divides the length d of the speed bump 100-1 into a start position ②, an intermediate position ③ and an end position ④ from the x-y coordinate with respect to the vehicle 1, and divides the road 100 into a front wheel entering position ① which is in front of the speed bump 100-1, the start position, the intermediate position, and the end position of the speed bump 100-1, from the x-y coordinate.

Next, with respect to ①, ②, ③, and ④, predicted torque of the vehicle 1 is divided into $\tau_1$, $\tau_2$, $\tau_3$, $\tau_4$, $\tau_5$, and $\tau_6$, a predicted passage time of the vehicle 1 is divided into $t_a$, $t_b$, $t_c$, $t_d$, $t_e$, $t_f$, $t_g$, $t_h$, and $t_i$, and a passage time of the vehicle 1 is divided into $t_0$, $t_1$, $t_2$, $t_3$, $t_4$, and $t_5$. In the instant case, each of $\tau_1$, $\tau_2$, $\tau_3$, $\tau_4$, $\tau_5$, and $\tau_6$, and $t_a$, $t_b$, $t_c$, $t_d$, $t_e$, $t_f$, $t_g$, $t_h$, and $t_i$, and $t_0$, $t_1$, $t_2$, $t_3$, $t_4$, and $t_5$ is a set value varying depending on a weight of the vehicle 1 and a suspension property of the front wheel, thus is not limited to a specific value.

The determination of the predicted torque in S60 is divided into determination when the front wheel passes through the speed bump 100-1 and determination when the rear wheel passes through the speed bump 100-1.

The predicted torque for passing the front wheel through each section of ②, ③, and ④ of the speed bump 100-1 is divided into predicted front wheel start position torque $\tau_5$, predicted front wheel intermediate position torque $\tau_1$, and predicted front wheel end position torque $\tau_5$. The predicted passage time for which the front wheel passes through each section of ①, ②, ③, and ④ of the road 100 is divided into a predicted front wheel approaching time $t_a$, a predicted front wheel entering time $t_b$, a predicted front wheel acceleration time $t_c$, a predicted front wheel deceleration time $t_d$, and a predicted front wheel passing time $t_e$. Furthermore, the passage time for which the front wheel passes through the road surface is divided into a front wheel entering time $t_0$, a front wheel intermediate passage time $t_1$, and a front wheel passage completion time $t_2$. In the instant case, $t_0$ is a time at which the front wheel is positioned at the start position ② of the speed bump 100-1, $t_1$ is a time at which the front wheel is positioned at the intermediate position ③ of the speed bump 100-1, and $t_2$ is a time at which the front wheel is positioned at the end position ④ of the speed bump 100-1. Therefore, $t_0$ is positioned between $t_a$ and $t_b$, $t_1$ is positioned between $t_c$ and $t_d$, and $t_2$ is positioned between $t_d$ and $t_e$.

The predicted torque for passing the rear wheel through each section of ②, ③, and ④ of the speed bump 100-1 is divided into predicted rear wheel start position torque $\tau_5$, predicted rear wheel intermediate position torque $\tau_2$, predicted rear wheel end position torque $\tau_6$, and vehicle speed recovering toque $\tau_4$ after the passage. Furthermore, the predicted passage time for which the rear wheel passes through each section of ①, ②, ③, and ④ of the road 100 is divided into a predicted rear wheel entering time $t_e$, a predicted rear wheel acceleration time $t_f$, a predicted rear wheel deceleration time $t_g$, a predicted rear wheel passing time $t_e$, and a vehicle speed recovering time $t_i$ after the passage. Furthermore, the passage time for which the rear wheel passes through the road surface is divided into a rear wheel entering time $t_3$, a rear wheel intermediate passage time $t_4$, and a rear wheel passage completion time $t_5$. In the instant case, $t_3$ is a time at which the rear wheel is positioned at the start position ② of the speed bump 100-1, $t_4$ is a time at which the rear wheel is positioned at the intermediate position ③ of the speed bump 100-1, and $t_5$ is a time at which the rear wheel is positioned at the end position ④ of the speed bump 100-1. Therefore, $t_3$ is positioned between $t_e$ and $t_f$, $t_4$ is positioned between $t_f$ and $t_g$, and $t_5$ is positioned between $t_g$ and $t_h$.

As a result, the passage time $t_0$, $t_1$, $t_2$, $t_3$, $t_4$, and $t_5$ of the vehicle 1 is determined by the following equations.

$$t_1 = t_0 + (0.5d)/v(t_0), t_2 = t_1 + (0.5d)/v(t_2), t_3 = t_2 + (L-d)/v(t_2),$$
$$t_4 = t_3 + (0.5d)/v(t_3), t_5 =$$
$$t_4 + (0.5d)/v(t_4) \quad \text{Passage time relationship equation}$$

The wheel torque for the target control value in S70 is determined by the following equation, and applied to the front wheel and the rear wheel passing through the speed bump 100-1, respectively.

$$T_{eng}(k) = T_{eng,target}(k+\tau),$$
$$P_{brk}(k) = [T_{brk,target}(k)]/K_{brk} \quad \text{Wheel torque relationship equation}$$

Here, $T_{eng}$ is a target engine torque control value, $T_{eng,target}$ is target engine torque, k is a time delay value of the engine, and $\tau$ is predicted engine torque. $P_{brk}$ is a target brake pressure control value, $T_{brk,target}$ is target brake pressure, and $K_{brk}$ is a brake constant according to a brake system property. Therefore, like the general engine torque generation method in which an input value is determined in advance by considering a time delay value of the engine to control the engine, the target engine torque control value may be input in advance by the time delay value of the engine, improving response speed of the engine having low response speed.

As a result, if the predicted torque $\tau_1$, $\tau^2$, $\tau_3$, $\tau_4$, $\tau_5$, and $\tau_6$ is on a vertical axis, and the time $t_a$, $t_b$, $t_c$, $t_d$, $t_e$, $t_f$, $t_g$, $t_h$, $t_i$, $t_0$, $t_1$, $t_2$, $t_3$, $t_4$, and $t_5$ is on a horizontal axis, the wheel torque (predicted torque and target control value) is formed to have a triangular pattern according to the relative positions of the front and rear wheels and the speed bump 100-1. From this, it may be appreciated that each of the engine torque and the brake torque determining the wheel torque of the vehicle 1 is determined based on the start points and the end points of the triangles, that is, a point in time when the front and rear wheels contact the speed bump 100-1, respectively, a point in time when the front and rear wheels reach the peak of the speed bump 100-1, respectively, and a point in time when the contact between the front and rear wheels and the speed bump 100-1 ends.

Thereafter, the controller 20 begins the road-surface auto driving mode control in S100, in which the road-surface auto driving mode control is performed by determining whether a speed bump (that is, the road surface shape portion) entering condition [T (vehicle entering condition time)=0.1 seconds] of the vehicle is satisfied in S110, confirming that the condition is satisfied in S110-1, performing a front wheel road surface control in S120, and performing a rear wheel road surface control in S130.

Figure 5:
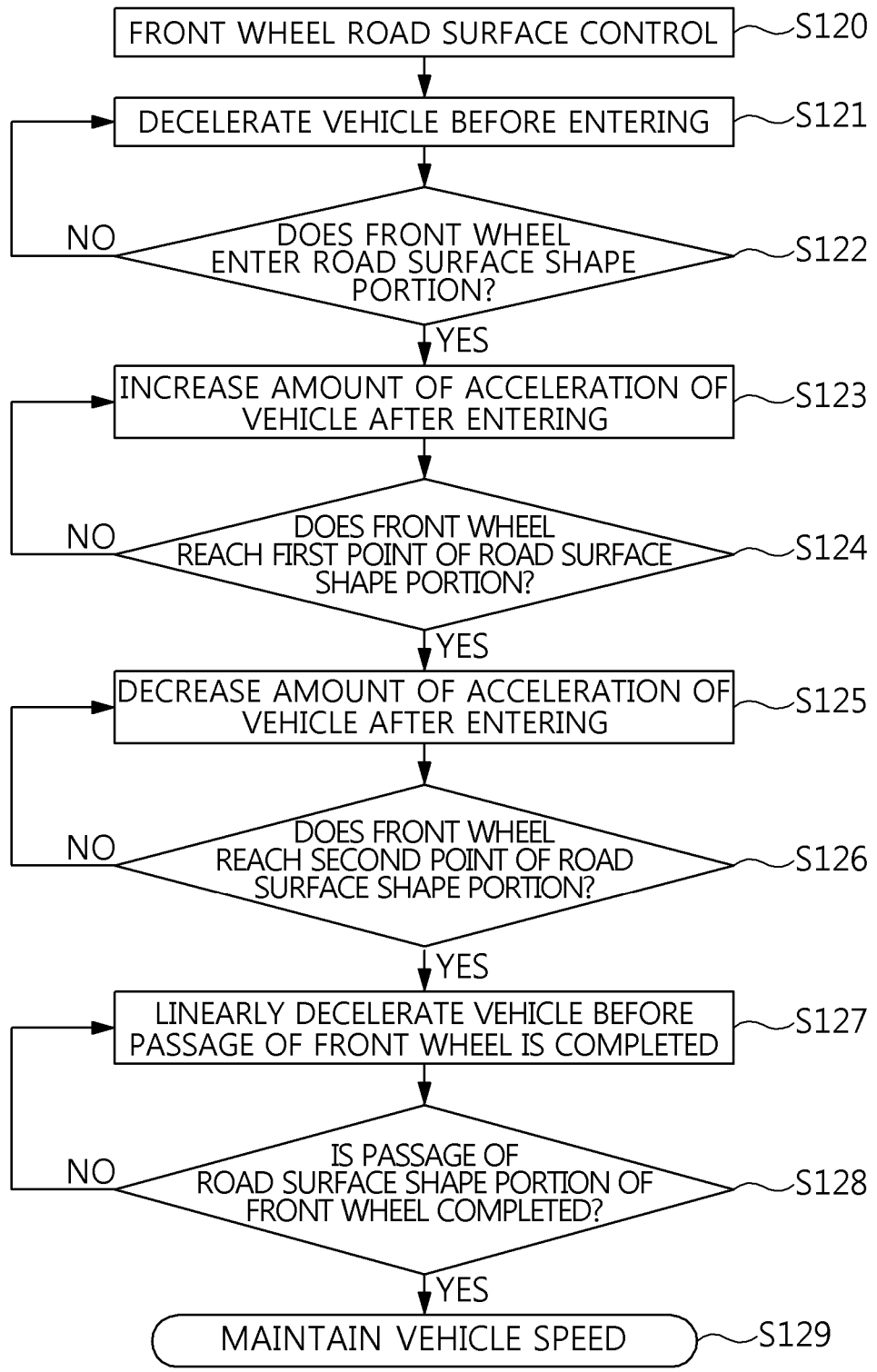
FIG. 5 is a flowchart of a front-wheel road surface control of the driving control method using road surface adaptability according to an exemplary embodiment of the present invention.

FIG. 5 is a flowchart of the front wheel road surface control method, which will be described with reference to FIG. 4. The controller 20 performs the front wheel road surface control by decelerating the vehicle before entering the road surface shape portion in S121, determining whether the front wheel enters the road surface shape portion in S122, increasing acceleration of the vehicle after entering the road surface shape portion in S123, determining whether the front wheel reaches a first point of the road surface shape portion in S124, decreasing acceleration of the vehicle after entering the road surface shape portion in S125, determining whether the front wheel reaches a second point of the road surface shape portion in S126, linearly decelerating the vehicle before the passage of the front wheel is completed in S127, determining whether the passage of the front wheel through the road surface shape portion is completed in S128, and maintaining vehicle speed after the passage of the front wheel in S129. In the instant case, when a section from the front wheel start position ② to the front wheel intermediate position of the speed bump 100-1 corresponds to ½ of the entire length of the speed bump 100-1, the first point means the ¼ point, and the second point means the ½ point.

Referring to FIG. 4, in the decelerating of the vehicle before entering the road surface shape portion in S121, the vehicle entering condition time T is 0.1 seconds, the deceleration is performed in a time section from $t_a$ to $t_0$ while applying $\tau_3$ as a target control value.

In the increasing of the acceleration of the vehicle after entering the road surface shape portion in S123, the acceleration is increased in a time section from $t_0$ to $t_c$ until reaching the ¼ point in S124 while applying $\tau_1$ as a target control value from $\tau_3$ if it is determined that the front wheel enters the road surface shape portion in S122, and in the decreasing of the acceleration of the vehicle after entering the road surface shape portion in S125, the acceleration is decreased in a time section from $t_c$ to $t_1$ until reaching the ½ point in S126 while applying $\tau_3$ as a target control value from $\tau_1$. Therefore, in S122 to S126, the acceleration is increased from the point in time when the front wheel enters the speed bump 100-1 to the ¼ point of the speed bump 100-1, and is then decreased to the ½ point (center), and the acceleration becomes 0 at the ½ point. As a result, the vehicle 1 is accelerated from the point in time when entering the start position ② until reaching the intermediate position ③, such that the squat effect is generated in the vehicle 1 minimizing impact generated at the time of the entering.

Thereafter, in the linearly decelerating of the vehicle before the passage of the front wheel is completed in S127, the deceleration is performed in a time section from $t_1$ to $t_d$ and $t_2$ until it is determined that the passage of the front wheel through the road surface shape portion is completed in S128 while applying $\tau_5$ as a target control value. Therefore, in S127 and S128, the deceleration is performed from the point in time when the front wheel passes the ½ point of the speed bump 100-1 until the front wheel gets out of the speed bump 100-1, and an amount of deceleration is linearly increased. As a result, the vehicle 1 is decelerated from the point in time when the vehicle descends from the intermediate position ③ until reaching the end position ④, such that the dive effect is generated in the vehicle 1 improving grip force on the downhill road.

Finally, the maintaining of the vehicle speed after the passage of the front wheel in S129 is performed in a time section from $t_2$ to $t_e$ and $t_3$ without applying a target control value. As a result, the vehicle 1 maintains its speed at the speed at the point in time when the passage of the front wheel through the speed bump is completed.

Figure 6:
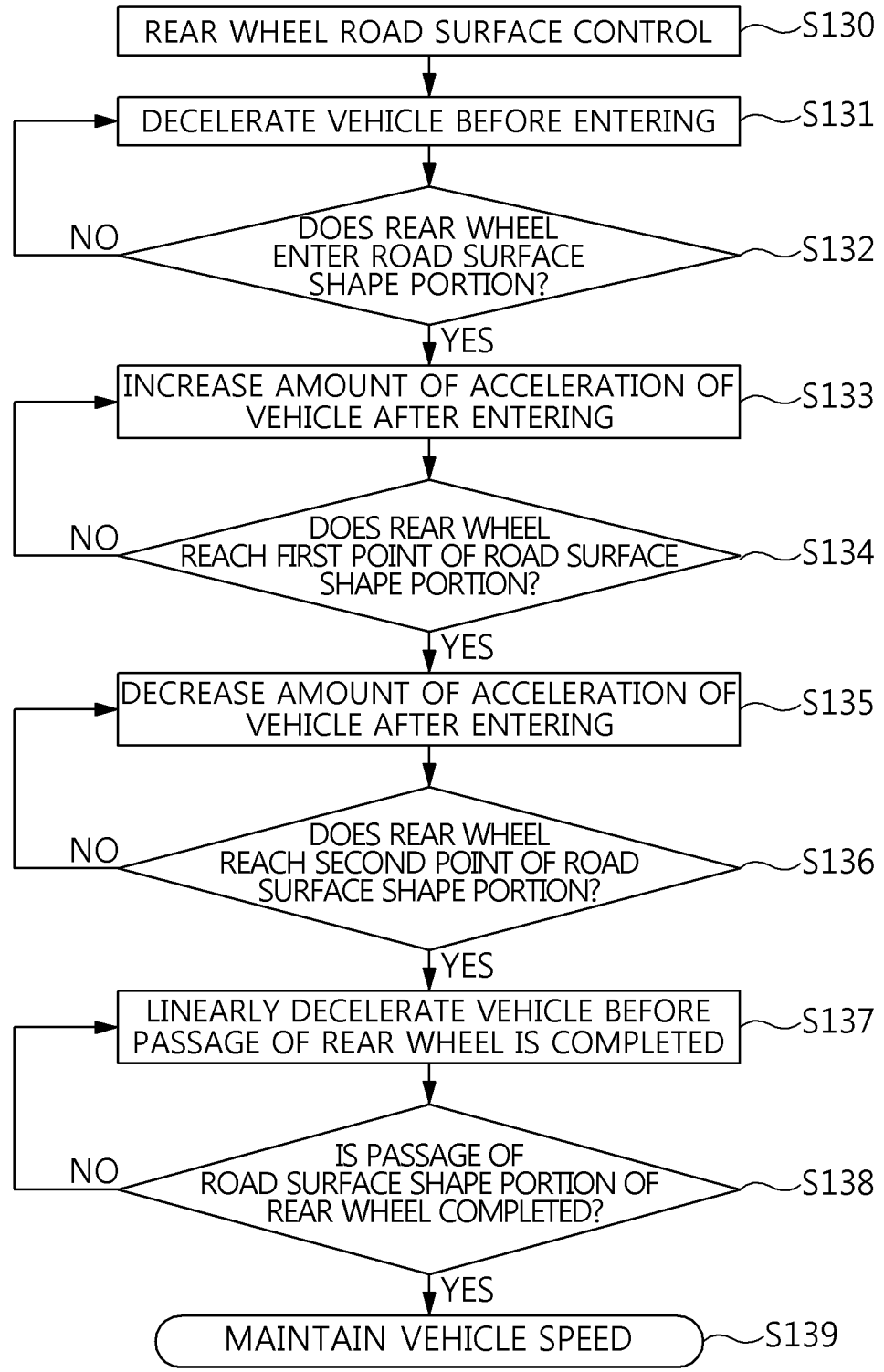
FIG. 6 is a flowchart of a rear-wheel road surface control of the driving control method using road surface adaptability according to an exemplary embodiment of the present invention.

FIG. 6 is a flowchart of the rear wheel road surface control method, which will be described with reference to FIG. 4. The controller 20 performs the rear wheel road surface control by decelerating the vehicle before entering the road surface shape portion in S131, determining whether the rear wheel enters the road surface shape portion in S132, increasing acceleration of the vehicle after entering the road surface shape portion in S133, determining whether the rear wheel reaches a first point of the road surface shape portion in S134, decreasing acceleration of the vehicle after entering the road surface shape portion in S135, determining whether the rear wheel reaches a second point of the road surface shape portion in S136, linearly decelerating the vehicle before the passage of the rear wheel is completed in S137, determining whether the passage of the rear wheel through the road surface shape portion is completed in S138, and maintaining vehicle speed after the passage of the rear wheel in S139. In the instant case, when a section from the rear wheel start position ② to the rear wheel intermediate position ③ of the speed bump 100-1 corresponds to ½ of the entire length of the speed bump 100-1, the first point means the ¼ point, and the second point means the ½ point.

Referring to FIG. 4, in the decelerating of the vehicle before entering the road surface shape portion in S131, after the rear wheel passes through the end position ④, the deceleration is performed in a time section from $t_2$ to $t_e$ and $t_3$ while applying $\tau_5$ as a target control value.

In the increasing of the acceleration of the vehicle after entering the road surface shape portion in S133, the acceleration is increased in a time section from $t_3$ and $t_f$ until reaching the ¼ point in S134 while applying $\tau_2$ as a target control value from $\tau_5$ if it is determined that the rear wheel enters the road surface shape portion in S132, and in the decreasing of the acceleration of the vehicle after entering the road surface shape portion in S135, the acceleration is decreased in a time section from $t_f$ and $t_4$ until reaching the ½ point in S136 while applying $\tau_3$ as a target control value from $\tau_2$. Therefore, in S132 to S136, the acceleration is increased from the point in time when the rear wheel enters the speed bump 100-1 to the ¼ point of the speed bump 100-1, and is then decreased to the ½ point (center), and the acceleration becomes 0 at the ½ point. As a result, the vehicle 1 is accelerated from the point in time when entering the start position ② until reaching the intermediate position ③, such that the squat effect is generated in the vehicle 1 minimizing impact generated at the time of the entering.

Thereafter, in the linearly decelerating of the vehicle before the passage of the rear wheel is completed in S137, the deceleration is performed in a time section from $t_4$ to $t_g$ and $t_5$ until it is determined that the passage of the rear wheel through the road surface shape portion is completed in S138 while applying $\tau_6$ as a target control value. Therefore, in S137 and S138, the deceleration is performed from the point in time when the rear wheel passes the ½ point of the speed bump 100-1 until the rear wheel gets out of the speed bump 100-1, and an amount of deceleration is linearly increased. As a result, the vehicle 1 is decelerated from the point in time when the vehicle descends from the intermediate position ③ until reaching the end position ④, such that the dive effect is generated in the vehicle 1 improving grip force on the downhill road.

Finally, the maintaining of the vehicle speed after the passage of the rear wheel in S139 is performed in a time section from $t_5$ to $t_h$ and $t_i$ without applying a target control value. As a result, the vehicle 1 maintains its speed at the speed at the point in time when the passage of the rear wheel through the speed bump is completed.

Thereafter, the controller 20 performs recovering of estimated vehicle speed in S140. Referring to FIG. 4, the recovering of the estimated vehicle speed in S140 means acceleration responding to an accelerator pedal or deceleration responding to a brake pedal after $t_i$, without applying a target control value. When the vehicle is stopped as in S300, the controller 20 terminates the driving control and is converted to an initial state.

Figure 7:
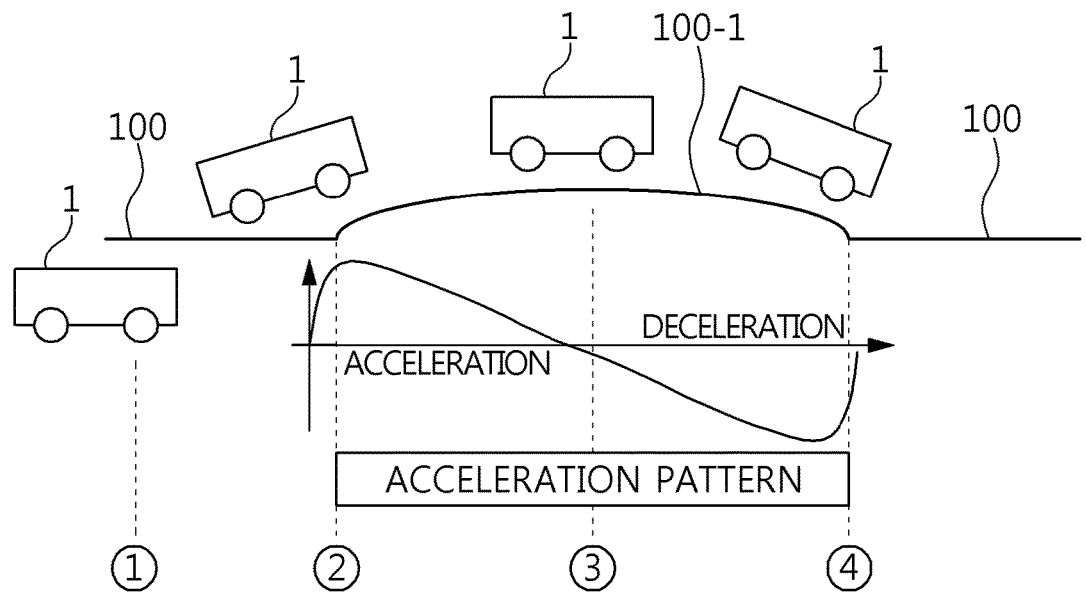
FIG. 7 is a diagram showing an operating state of the front/rear-wheel road surface control of the vehicle according to an exemplary embodiment of the present invention.

Meanwhile, FIG. 7 illustrates an operating state of the vehicle 1 when passing through the speed bump 100-1 by use of the road-surface auto driving mode control S100.

As illustrated, the vehicle 1 is decelerated from the front wheel entering position ① to the start position ② until 0.1 seconds before reaching the start position ②, is accelerated from the start position ② to the intermediate position ③ and accelerated immediately before entering the start position ② to generate the squat effect minimizing impact generated at the time of the entering, is driven at constant speed at the intermediate position ③, and is decelerated from the intermediate position ③ until getting out of the end position ④ to generate the dive effect, improving grip force on the downhill road. As a result, the acceleration pattern is formed in a gentle sine wave form with respect to the intermediate position ③, such that the center of gravity of the vehicle is not moved by the squat effect and the dive effect.

Figure 8:
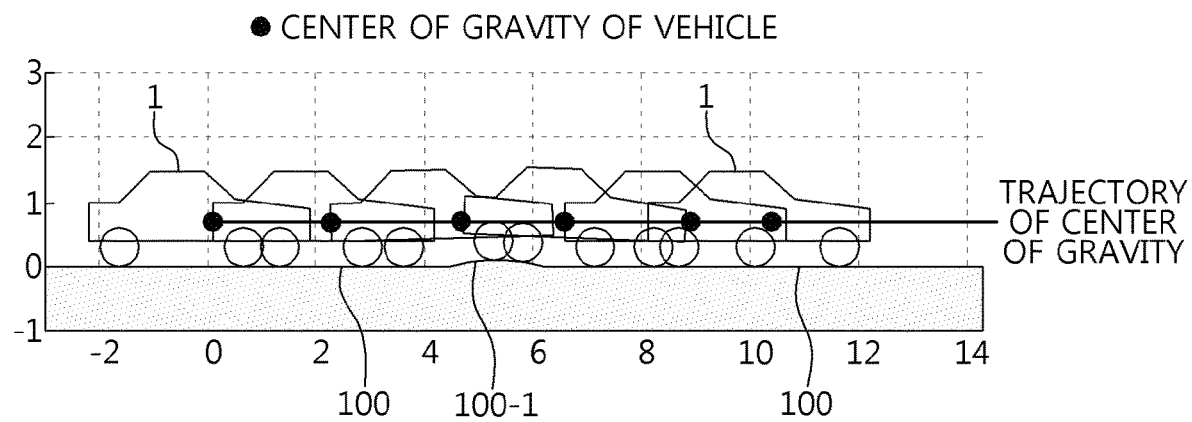
FIG. 8 is a diagram showing a trajectory of a change of the center of gravity of the vehicle according to the front/rear-wheel road surface control of the vehicle according to an exemplary embodiment of the present invention.

FIG. 8 illustrates an operating state of the vehicle 1 when passing through the speed bump 100-1 by use of the road-surface auto driving mode control S100. As illustrated, there is almost no change in a trajectory of the center of gravity, in a vertical direction with respect to the road surface 100, of the vehicle 1 in which the front wheel control (S120) and the rear wheel control (S130) are performed for the speed bump 100-1.

Meanwhile, when the uneven road surface of the road 100 is a sunken road surface including a pothole, the road-surface adaptive driving control method may be controlled in reverse of the case of the speed bump 100-1. For example, the speed bump 100-1 is divided into the start position ② and the end position ④ at right and left sides, respectively based on the intermediate position ③ as a peak position, and similarly, the sunken road surface is divided into a start position ② and an end position ④ at right and left sides, respectively based on an intermediate position ③ as a lowest position. Therefore, when the vehicle passes through the sunken road surface, a control is performed so that the dive effect is generated from the start position ② to the intermediate position ③ as the lowest position, and then a control is performed so that the squat effect is generated from the intermediate position ③ as the lowest position to the end position ④, implementing the same effect of improving ride comfort as the case of passing through the speed bump 100-1.

As described above, in the advanced driving control system 10 according to the present embodiment, the driving control function is implemented by the road surface adaptability control in which the wheel torque of the vehicle 1 is controlled so that when the speed bump 100-1 is confirmed from the road image photographed by the camera or LiDAR, the squat effect and dive effect are generated in the vehicle 1 when the wheel of the vehicle 1 passes though the speed bump 100-1. As a result, the center of gravity of the vehicle 1 is almost constantly maintained at the time of passing through the speed bump 100-1 improving ride comfort. By the wheel torque control by the engine and the brake, it is possible to realize relatively advantageous weight and cost as compared to the case of using the hydraulic cylinder.

In accordance with the exemplary embodiments of the present invention, the driving control technology using road surface adaptability according to an exemplary embodiment of the present invention implements the following actions and effects.

First, the driving control technology may depart from the method of using the hydraulic cylinder, by use of the squat effect and the dive effect generated by a change of a vehicle speed. Second, an effect of improving ride comfort on various uneven road surfaces including protruding surfaces including a speed bump and sunken road surfaces including a pothole is excellent. Third, it is possible to improve ride comfort by decreasing relative acceleration by controlling engine torque and brake torque. Fourth, it is possible to obtain rapid response performance by preparation in advance even when a response time is long like engine, by determining required control input corresponding to the uneven road surface shape using the camera in advance. Fifth, the driving control technology using road surface adaptability may be implemented by use of basic apparatuses in a vehicle including the driving control apparatus, the brake control apparatus and the engine control apparatus.

Furthermore, the advanced driving control system according to an exemplary embodiment of the present invention is implemented by the driving control technology using road surface adaptability to implement the following actions and effects.

First, the advanced driving control system may depart from the method of using the hydraulic cylinder by being implemented by a camera and a wheel torque control apparatus. Second, the wheel torque control is performed by the driving force or braking force, thus the advanced driving control system may be configured for the brake control apparatus and the engine control apparatus that are basically mounted. Third, the required control input is determined based on road surface shape information, thus various environment detectors including a monocular camera, a stereo camera, LiDAR, etc. may be applied. Fourth, the hydraulic cylinder requiring a lot of power is not required in each suspension of four wheels, reducing weight and realizing advantageous cost. Fifth, applicability in a vehicle is excellent since the weight and cost are low, and there is no unnecessary power consumption.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A driving control method, comprising:
    performing a road surface adaptability control in which, when an uneven road surface of a road on which a vehicle is driven is recognized by a controller, a wheel torque control of the vehicle is performed so that a squat effect and a dive effect are generated in the vehicle passing over the uneven road surface,
    wherein the performing of the road surface adaptability control includes:
        performing determination of road surface adaptability in which a road image of the road is photographed by an detector mounted in the vehicle and the uneven road surface is detected in the road image;
        performing a road-surface auto driving mode control in which a wheel torque for changing a vehicle speed of the vehicle before the vehicle passes over the uneven road surface is determined upon detecting the uneven road surface, and the wheel torque control is performed based on the wheel torque so that the squat effect and the dive effect are generated in the vehicle while the vehicle approaches and passes over the uneven road surface to change the vehicle speed of the vehicle; and recovering the vehicle speed by driving the vehicle in a state in which the wheel torque control is stopped after passing over the uneven road surface,
wherein the wheel torque control sets an acceleration of the vehicle to a value of zero at a half point of the uneven road surface that is converted from the squat effect to the dive effect, and
wherein a pattern of the acceleration is formed in a sine wave with respect to the half point of the uneven road surface, such that a center of gravity of the vehicle is not moved by the squat effect and the dive effect, and
wherein the performing of the road-surface auto driving mode control includes performing of a wheel road surface control by:
performing deceleration of the vehicle between a front entering position and a start position of the uneven road surface;
performing the acceleration of the vehicle between the start position and an intermediate position of the uneven road surface; and
performing deceleration of the vehicle between the intermediate position and an end position of the uneven road surface.

2. The driving control method of claim 1, wherein in the wheel torque control, the vehicle speed is changed by engine torque and brake torque.

3. The driving control method of claim 1, wherein the uneven road surface is detected in the road image photographed by one of a monocular camera, a stereo camera, and light detection and range (LiDAR).

4. The driving control method of claim 1, wherein the vehicle includes a first wheel and a second wheel and the passing over the uneven road surface includes a case in which the second wheel of the vehicle gets out of the uneven road surface, subsequent to passing of the first wheel of the vehicle over the uneven road surface under the performing of the road surface adaptability control.

5. The driving control method of claim 1, wherein the performing of the road-surface auto driving mode control further includes:
generating a coordinate of the uneven road surface to recognize a road surface shape;
determining a preset wheel torque for passing over the uneven road surface;
determining a wheel torque for approaching and passing over the uneven road surface as a target control value based on the preset wheel torque; and
performing the wheel torque control based on the wheel torque for approaching and passing over the uneven road surface.

6. The driving control method of claim 5, wherein the preset wheel torque is a preset engine torque and a preset brake torque of the vehicle, and the wheel torque for approaching and passing over the uneven road surface is a target engine torque and a target brake torque of the vehicle.

7. The driving control method of claim 5, wherein the performing of the wheel torque control based on the wheel torque for approaching and passing over the uneven road surface control includes:
dividing the uneven road surface into the front entering position, the start position, the intermediate position, and the end position in a driving direction of the vehicle, as values of the coordinate of the uneven road surface and setting the front entering position as a reference position to determine a wheel approach condition of the vehicle with respect to the uneven road surface; and performing the wheel road surface control on a wheel of the vehicle entering the uneven road surface when the wheel approach condition is satisfied to generate the squat effect and the dive effect.

8. The driving control method of claim 1,
wherein the performing of the deceleration of the vehicle between the front entering position and the start position includes applying a brake torque, and,
wherein the performing of the acceleration of the vehicle between the start position and the intermediate position, includes applying an engine torque.

9. The driving control method of claim 1, wherein the performing deceleration of the vehicle between the intermediate position and the end position, includes a brake torque.

10. The driving control method of claim 1, wherein the performing of the wheel road surface control further includes:
maintaining the vehicle speed for a predetermined time by stopping the wheel torque control when the wheel gets out of the end position.

11. The driving control method of claim 1, wherein the deceleration of the vehicle between the front entering position and the start position is performed for 0.1 seconds before the start position.

12. The driving control method of claim 1, wherein in the performing of the acceleration of the vehicle between the start position and the intermediate position, an amount of the acceleration is increased for a first predetermined time period and then the amount of the acceleration is decreased for a second predetermined time period, by the wheel torque control.

13. The driving control method of claim 12, wherein in reaching the intermediate position, the amount of the acceleration is decreased to be zero, according to the wheel torque control.

14. The driving control method of claim 4, wherein the performing of the road-surface auto driving mode control further includes:
generating a coordinate of the uneven road surface to recognize a road surface shape;
determining a preset wheel torque for passing over the uneven road surface;
determining a wheel torque for approaching and passing over the uneven road surface as a target control value based on the preset wheel torque; and
performing the wheel torque control based on the wheel torque for approaching and passing over the uneven road surface,
wherein the preset wheel torque is a preset engine torque and a preset brake torque of the vehicle, and the wheel torque for approaching and passing over the uneven road surface is a target engine torque and a target brake torque of the vehicle, and
wherein the performing of the wheel torque control based on the wheel torque for approaching and passing over the uneven road surface control includes:
dividing the uneven road surface into the front entering position, the start position, the intermediate position, and the end position in a driving direction of the vehicle, as values of the coordinate of the uneven road surface and setting the front entering position as a reference position to determine a wheel approach condition of the vehicle with respect to the uneven road surface; and
performing a wheel road surface control on each of the first and second wheels of the vehicle entering the uneven road surface when the wheel approach condition is satisfied to generate the squat effect and the dive effect.

15. The driving control method of claim 1, wherein, when the uneven road surface is not detected, a vehicle-speed auto driving mode control for securing driving stability by controlling the vehicle speed with respect to an even road surface, is performed.

16. A driving control system, comprising:
an detector configured to be mounted in a vehicle including a suspension system in each of a predetermined number of wheels of the vehicle and detect an uneven road surface in a photographed road image of a road on which the vehicle is driven;
a controller configured to perform a wheel torque control of the vehicle in which the vehicle is accelerated when the vehicle passing over the uneven road surface to generate a squat effect in the vehicle and then is decelerated to generate a dive effect in the vehicle; and
a road surface adaptability map configured to be linked with the controller to determine wheel torque for the wheel torque control,
wherein the wheel torque control sets an acceleration of the vehicle to a value of zero at a half point of the uneven road surface that is converted from the squat effect to the dive effect,
wherein a pattern of the acceleration is formed in a sine wave with respect to the half point of the uneven road surface, such that a center of gravity of the vehicle is not moved by the squat effect and the dive effect, and
wherein the controller is configured to perform of a wheel road surface control by:
performing deceleration of the vehicle between a front entering position and a start position of the uneven road surface;
performing the acceleration of the vehicle between the start position and an intermediate position of the uneven road surface; and
performing deceleration of the vehicle between the intermediate position and an end position of the uneven road surface.

17. The driving control system of claim 16, wherein the wheel torque control is performed respectively on a first wheel and a second wheel among the predetermined number of wheels of the vehicle passing over the uneven road surface.

18. The driving control system of claim 16, wherein the detector is configured by one of a monocular camera, a stereo camera, light detection and range (LiDAR), or a combination thereof.

* * * * *